(12) United States Patent
Vik et al.

(10) Patent No.: US 9,855,843 B2
(45) Date of Patent: *Jan. 2, 2018

(54) SYSTEM AND METHOD FOR CONTROLLING THE SPEED OF A TRACK-DRIVEN WORK VEHICLE BASED ON MONITORED LOADS TO AVOID TRACK OVERHEATING

(71) Applicant: CNH Industrial America, LLC, New Holland, PA (US)

(72) Inventors: Brian Vik, Barnesville, MN (US); Jason Novacek, West Fargo, ND (US); Mark Krogen, West Fargo, ND (US); David Tveito, West Fargo, ND (US); Russell Stoltman, Argusville, ND (US)

(73) Assignee: CNH Industrial America LLC, New Holland, PA (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/051,911

(22) Filed: Feb. 24, 2016

(65) Prior Publication Data

US 2017/0240046 A1 Aug. 24, 2017

(51) Int. Cl.
*G06F 19/00* (2011.01)
*B60K 31/00* (2006.01)
(Continued)

(52) U.S. Cl.
CPC ............. *B60K 31/00* (2013.01); *B60W 10/06* (2013.01); *B60W 10/10* (2013.01); *B60W 30/18* (2013.01);
(Continued)

(58) Field of Classification Search
CPC .......... B60K 31/00; B60K 2031/0091; B60W 10/06; B60W 10/10; B60W 30/18;
(Continued)

(56) References Cited

U.S. PATENT DOCUMENTS 5,295,921 A 3/1994 Ippolito et al.
5,390,996 A 2/1995 Bliss
(Continued)

FOREIGN PATENT DOCUMENTS

DE 2910180 10/1980
DE 19513516 10/1996
(Continued)

*Primary Examiner* — Gertrude Arthur Jeanglaude
(74) *Attorney, Agent, or Firm* — Rickard K. DeMille; Rebecca L. Henkel (57) ABSTRACT

A method for automatically controlling vehicle speeds of a track-based work vehicle may include monitoring, with a computing device, a load transmitted through a pivot pin of a track assembly of the work vehicle and determining, with the computing device, a speed limit setting for the work vehicle based on the monitored load, wherein the speed limit setting is associated with maintaining an operating temperature of a track of the track assembly below a predetermined temperature threshold. In addition, the method may include automatically limiting, with the computing device, a vehicle speed of the work vehicle based on the determined speed limit setting.

20 Claims, 5 Drawing Sheets

(51) Int. Cl.
  *B62D 55/065* (2006.01)
  *B62D 49/06* (2006.01)
  *B60W 10/06* (2006.01)
  *B60W 10/10* (2012.01)
  *B60W 30/18* (2012.01)

(52) U.S. Cl.
  CPC ........... *B62D 49/06* (2013.01); *B62D 55/065* (2013.01); *B60K 2031/0091* (2013.01); *B60W 2300/152* (2013.01); *B60W 2300/44* (2013.01); *B60W 2530/10* (2013.01); *B60W 2720/10* (2013.01); *B60Y 2200/221* (2013.01); *B60Y 2200/25* (2013.01); *B60Y 2300/18* (2013.01)

(58) Field of Classification Search
  CPC ......... B60W 2300/44; B60W 2530/10; B60W 2720/10; B62D 49/06; B62D 55/065; B60Y 2200/221; B60Y 2200/15; B60Y 2300/18
  USPC .............................. 701/36, 50, 93; 172/4.5, 9
  See application file for complete search history.

(56) References Cited

U.S. PATENT DOCUMENTS

| | | | |
|---|---|---|---|
| 5,505,482 A | 4/1996 | VanDenberg | |
| 5,690,002 A | 11/1997 | Showalter | |
| 5,699,888 A | 12/1997 | Showalter | |
| 5,884,738 A | 3/1999 | Joslin et al. | |
| 6,098,770 A | 8/2000 | Isley, Jr. | |
| 6,425,450 B1 * | 7/2002 | Lansberry | B62D 49/0635 180/6.24 |
| 6,533,090 B2 | 3/2003 | Osborn et al. | |
| 6,578,654 B2 | 6/2003 | Porter | |
| 6,766,236 B1 | 7/2004 | Lamela et al. | |
| 6,779,420 B2 | 8/2004 | Peura | |
| 6,803,530 B2 | 10/2004 | Carlstrom et al. | |
| 6,860,145 B2 | 3/2005 | Bergst et al. | |
| 7,027,900 B2 | 4/2006 | Kumar et al. | |
| 7,072,763 B2 | 7/2006 | Saxon et al. | |
| 7,507,917 B2 | 3/2009 | Kaltenheuser | |
| 8,065,061 B2 | 11/2011 | O'Neal | |
| 8,280,591 B2 | 10/2012 | Serarslan et al. | |
| 8,612,066 B2 | 12/2013 | O'Neal | |
| 8,727,047 B2 | 5/2014 | Janzen et al. | |
| 8,965,640 B2 | 2/2015 | Faivre et al. | |
| 8,972,129 B2 | 3/2015 | Faivre et al. | |
| 8,985,250 B1 | 3/2015 | Lussier et al. | |
| 9,078,391 B2 | 7/2015 | Pichlmaier | |
| 9,086,698 B2 | 7/2015 | Faivre et al. | |
| 2014/0343774 A1 | 11/2014 | Wimmer et al. | |

FOREIGN PATENT DOCUMENTS

| | | |
|---|---|---|
| DE | 19921856 | 11/2000 |
| EP | 1190885 | 3/2002 |
| WO | WO 2013/190570 | 12/2013 |

* cited by examiner

SYSTEM AND METHOD FOR CONTROLLING THE SPEED OF A TRACK-DRIVEN WORK VEHICLE BASED ON MONITORED LOADS TO AVOID TRACK OVERHEATING

FIELD OF THE INVENTION

The present subject matter relates generally to track-driven work vehicles and, more particularly, to a system and method for automatically controlling the ground speed of a track-driven work vehicle based on monitored track loads so as to prevent overheating of the track during vehicle operation.

BACKGROUND OF THE INVENTION

Current work vehicles, such as tractors and other agricultural vehicles, include an electronically controlled engine and a transmission, such as a power shift transmission (PST) or a continuously variable transmission (CVT), coupled to the engine. The transmission is, in turn, coupled to at least one drive axle assembly for transferring torque from the transmission to the vehicle's wheels or tracks. For track-driven vehicles, a track drive box or gearbox is typically rotationally coupled to the drive axle assembly for transferring the torque transmitted through the axle assembly to a drive wheel of each of the vehicle's drive track assemblies. As is generally understood, the drive wheel is rotationally engaged with a corresponding endless track such that rotation of the drive wheel rotates the track, thereby allowing the vehicle to be driven forward or backward.

The track for a track-driven work vehicle is often formed from an elastomeric material, such as rubber. While rubber-based tracks offer numerous advantages, such tracks are often subject to accelerated wear and tear due to excessive heating. For instance, heavy loads and/or high travel speeds may create hysteresis heating within a rubber track, which may cause premature aging of the underling rubber material. Such premature aging can lead to damage and/or failure of the track.

Accordingly, a system and method for automatically controlling the speed of a track-driven work vehicle based on monitored track loads so as to prevent excessive heat generation within the vehicle's tracks would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for automatically controlling vehicle speeds of a track-based work vehicle. The method may include monitoring, with a computing device, a load transmitted through a pivot pin of a track assembly of the work vehicle and determining, with the computing device, a speed limit setting for the work vehicle based on the monitored load, wherein the speed limit setting is associated with maintaining an operating temperature of a track of the track assembly below a predetermined temperature threshold. In addition, the method may include automatically limiting, with the computing device, a vehicle speed of the work vehicle based on the determined speed limit setting.

In another aspect, the present subject matter is directed to a system for automatically controlling vehicle speeds of a track-based work vehicle. The system may include a track assembly having an undercarriage support beam and a drive wheel configured to engage a track. The track assembly may also include a pivot pin configured to pivotally couple the undercarriage support beam to a chassis of the work vehicle. In addition, the system may include a load sensor configured to monitor a load transmitted through the pivot pin and a controller communicatively coupled to the load sensor. The controller may be configured to determine a speed limit setting for the work vehicle based on the monitored load. Moreover, the controller may be configured to automatically limit a vehicle speed of the work vehicle based on the determined speed limit setting, wherein the speed limit setting is associated with maintaining an operating temperature of the track below a predetermined temperature threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for automatically controlling the speed of a track-driven work vehicle based on monitored track loads. Specifically, in several embodiments, the system may include one or more load sensors provided in operative association with a pivot pin(s) of one or more of the vehicle's track assemblies. The load sensor(s) may be configured to detect the load(s) (e.g., horizontal and/or vertical loads) being transmitted through its associated pivot pin, which may provide an indication of the overall loading on the vehicle's tracks (e.g., pressure forces acting on the tracks due to the weight of the vehicle). The monitored loads may then be used as a basis for automatically limiting the speed of the work vehicle to prevent overheating of the tracks. For instance, in one embodiment, a controller of the system may be configured to correlate the monitored track load to a predetermined speed limit setting for the work vehicle, such as by referencing a look-up table that provides a predetermined loading/speed schedule for the work vehicle and/or by calculating the speed limit setting based on a mathematical function or model that relates track loading to vehicle speed. In such instance, the relationship between the monitored load and the speed limit setting may be selected or determined based on the vehicle configuration and/or one or more track parameters (e.g., the material composition of the track, the track thickness, etc.) such that, for a given track load, a maximum speed limit is set for the vehicle that is designed to prevent temperature-based damage to the vehicle's tracks. For example, the speed limit setting for a given track load may be selected so that the operating temperature of each track does not exceed a predetermined temperature threshold defined for such track. Once the desired speed limit setting is determined, the controller may then control the operation of the work vehicle (e.g., by controlling the operation of the transmission and/or the engine) such that the ground speed of the work vehicle does not exceed the speed limit set by the controller based on the current loading conditions, thereby avoiding excessive heat generation within the vehicle's tracks.

Figure 1:
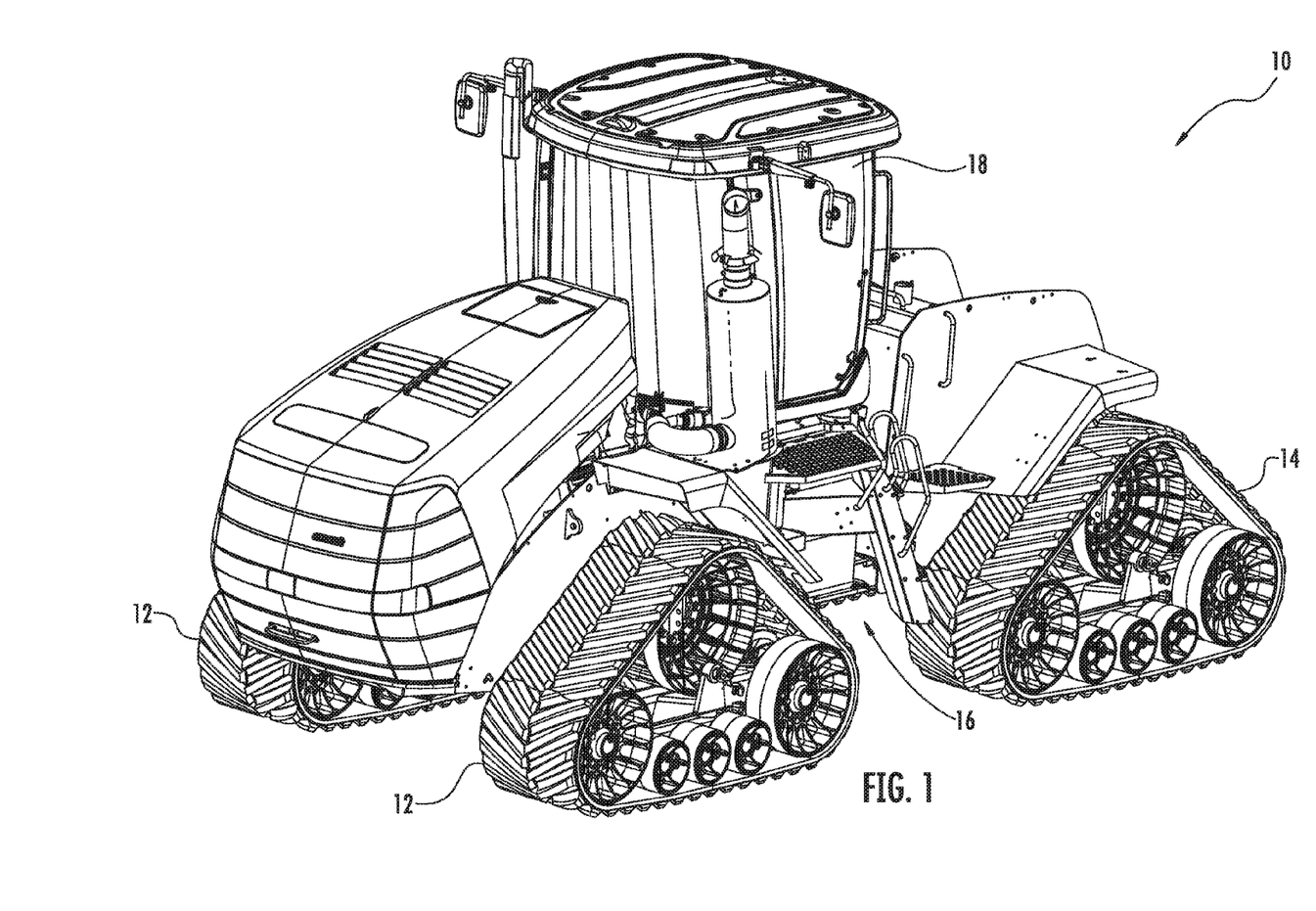
FIG. 1 illustrates a perspective view of one embodiment of a track-driven work vehicle in accordance with aspects of the present subject matter.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front track assemblies 12, a pair or rear track assemblies 14 (only one of which is shown), and a chassis 16 coupled to and supported by the track assemblies 12, 14. As will be described below with reference to FIG. 3, the work vehicle 10 may also include a drivetrain including an engine, a transmission and front and rear axle assemblies supported by the chassis 16. Additionally, an enclosed operator's cab 18 is supported by a portion of the chassis 16 and may house various control devices (not shown) for permitting an operator to control the operation of the work vehicle 10.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include an open operator's cab 18 and/or may be configured to be operably coupled to any suitable type of work implement, such as a trailer, spray boom, manure tank, feed grinder, plow and/or the like.

Figure 2:
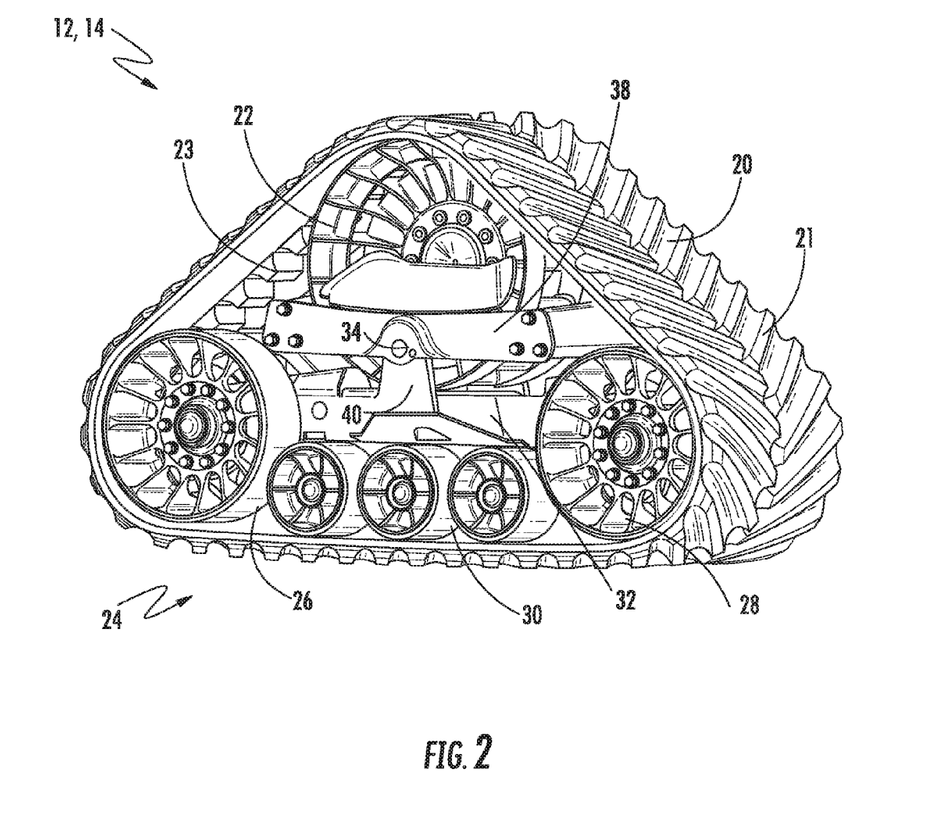
FIG. 2 illustrates a perspective view of one embodiment of a track assembly suitable for use with the work vehicle shown in FIG. 1 in accordance with aspects of the present subject matter.

Referring now to FIG. 2, a perspective view of an exemplary embodiment of one of the front track assemblies 12, 14 shown in FIG. 1 is illustrated in accordance with aspects of the present subject matter. As shown, the track assembly 12, 14 may generally include a track 20, a drive wheel 22 for mechanically engaging the track 20, and an undercarriage 24. The undercarriage 24 may include front and rear idler wheels 26, 28 about which the track 20 is wrapped and a plurality of roller wheels 30 for guiding the track 20. Additionally, the undercarriage 24 may include an undercarriage support beam 32 configured to support the idler and roller wheels 26, 28, 30. For example, as shown in FIG. 2, the undercarriage support beam 32 may extend fore-to-aft within the track assembly 12, 14 to allow the various wheels 26, 28, 30 to be coupled thereto.

As shown in FIG. 2, the track 20 corresponds to an endless or continuously looped track including a plurality of treads 21 defining a tread pattern along an outer surface of the track 20. In general, the track 20 may be comprised of any suitable material and may define any suitable tread pattern. For example, in several embodiments, the track 20 may be formed at least partially from an elastomeric material, such as a rubber material or a steel-reinforced rubber material. The treads 21 may be formed integrally with the track 20 or may be separately attached to the track 20, such as by chemically bonding the treads 21 to the track 20. Additionally, as shown in FIG. 2, the track 20 may include a plurality of longitudinally spaced drive lugs 23 extending radially inwardly from an inner surface of the track 20. As is generally understood, the drive lugs 23 may be configured to be mechanically engaged by the drive wheel 22 such that, as the drive wheel 22 is rotated, the track 20 rotates around the endless loop in order to drive the work vehicle 10.

Figure 3:
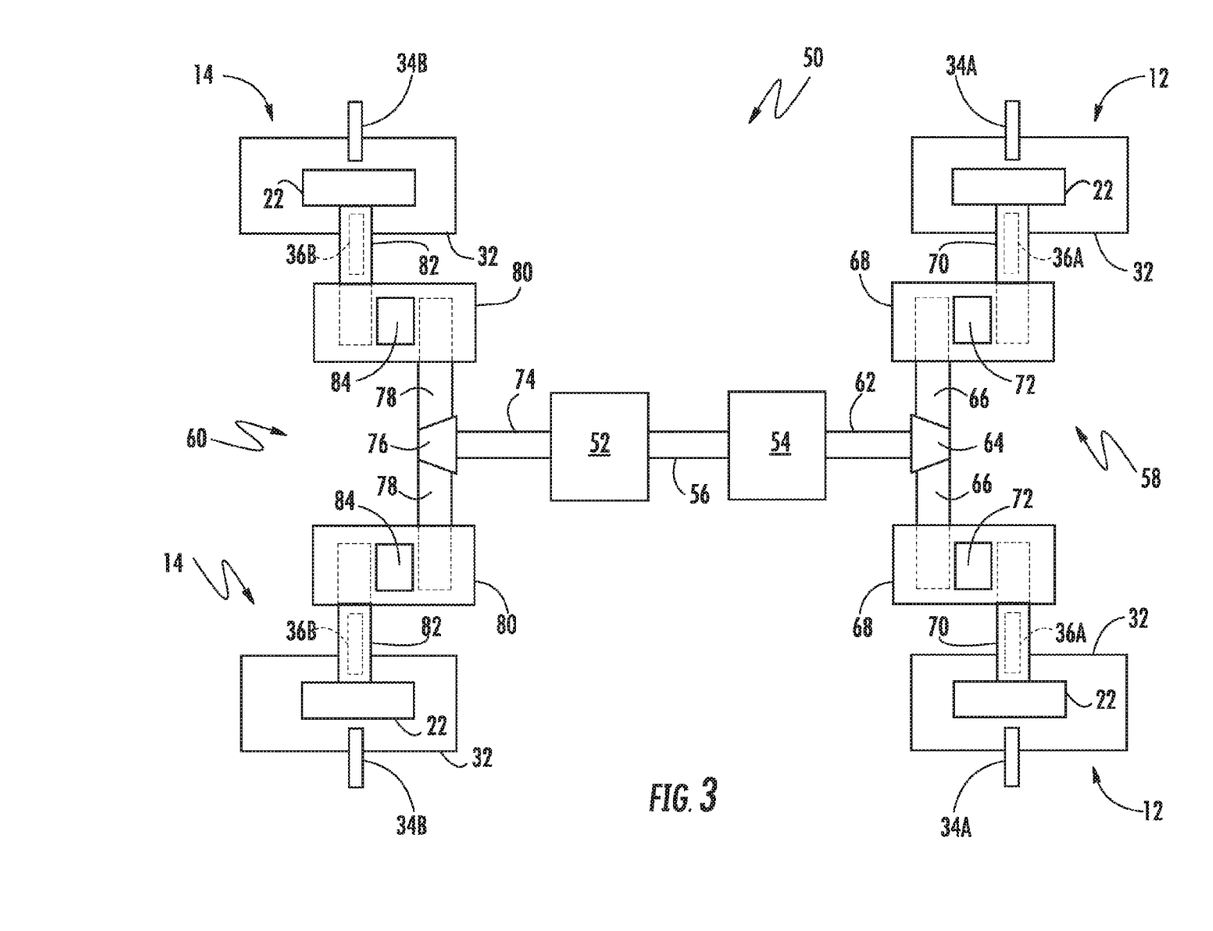
FIG. 3 illustrates a simplified, schematic view of one embodiment of various drivetrain components suitable for use with the work vehicle shown in FIG. 1 in accordance with aspects of the present subject matter.

Moreover, as is generally understood, the undercarriage support beam 32 may be pivotally supported on the vehicle chassis 16 (FIG. 1) by two pivot pins, namely an outboard pivot pin 34 and an inboard pivot pin 36 (FIG. 3). The outboard pivot pin 34 is located outboard of the drive wheel 22 while the inboard pivot pin 36 is located inboard of the drive wheel 22 and is secured on the vehicle chassis 16. In general, the outboard pivot pin 34 may be configured to be coupled between an undercarriage bearing support member 38 and a bracket 40 secured to the undercarriage support beam 32. For example, the pivot pin 34 may be configured to be received within corresponding openings (not shown) defined through the bearing support member 38 and the bracket 40. The bearing support member 38 may, in turn, be secured at each of its ends to support posts (not shown) coupled to the vehicle chassis 16. As such, the outboard pivot pin 34 may serve to pivotally couple the undercarriage support beam 32 to the chassis 16.

It should be appreciated that a similar pivotal support arrangement may also be provided on the vehicle chassis 16 inboard of the drive wheel 22 utilizing the inboard pivot pin 36. For example, a separate bracket (not shown) located inboard of the drive wheel 22 may be coupled to the undercarriage support beam 32. In such an embodiment, the inboard pivot pin 36 may be pivotally coupled between the inboard bracket and the chassis 16 to provide a pivotal connection between the undercarriage support beam 32 and the chassis 16.

It should also be appreciated that the track assembly 12, 14 shown in FIG. 2 is simply illustrated to provide one example of a suitable track assembly configuration. In other embodiments, the track assembly 12, 14 may have any other suitable track-based configuration.

Referring now to FIG. 3, a schematic, simplified view of one embodiment of a drivetrain 50 suitable for transferring power to the drive wheels 22 of the track assemblies 12, 14 of the work vehicle 10 described above is illustrated in accordance with aspects of the present subject matter. As shown, the drivetrain 50 may generally include an engine 52 and a transmission 54 configured to be mounted on the chassis 16 (FIG. 1) of the work vehicle 10. The transmission 54 may be operably coupled to the engine 52 via one or more output shafts 56 and may be configured to provide variably adjusted gear ratios for transferring engine power to the drive wheels 22 of the front and rear track assemblies 12, 14. As shown in FIG. 3, engine power may be transferred to each front track assembly 12 via a front axle assembly 58 while engine power may be transferred to each rear track assembly 14 via a rear axle assembly 60. The front axle assembly 58 may include a drive shaft 62 coupled to a front differential 64 and one or more front axle shafts 66 coupled to the front differential 54 for transferring power to the respective drive wheels 22 of the front track assemblies 12 via corresponding front track drive boxes 68. For example, as shown in FIG. 3, the front axle shaft(s) 66 may be rotationally coupled to drive shafts 70 associated with the drive wheels 22 via one or more internal gears 72 of the front track drive boxes 68. Similarly, the rear axle assembly 60 may include a drive shaft 74 coupled to a rear differential 76 and one or more rear axle shafts 78 coupled to the rear differential 76 for transferring power to the respective drive wheels 22 of the rear track assemblies 14 via rear track drive boxes 80. For example, as shown in FIG. 3, the rear axle shaft(s) 78 may be rotationally coupled to drive shafts 82 associated with the drive wheels 22 via one or more internal gears 84 of the rear track drive boxes 80.

Additionally, as indicated above, the front and rear track assemblies 12, 14 may include pivot pins 34, 36 for pivotally coupling each undercarriage support beam 32 to the vehicle chassis 16. As shown schematically in FIG. 3, each front track assembly 12 may include a front outboard pivot pin 34A located outboard of its drive wheel 22 and a front inboard pivot pin 36A (shown in dashed lines) located inboard of the drive wheel 22. Similarly, each rear track assembly 14 may include a rear outboard pivot pin 34B located outboard of its drive wheel 22 and a rear inboard pivot pin 36B (shown in dashed lines) located inboard of the drive wheel 22.

It should be appreciated that, although the configuration of the work vehicle 10 shown in FIG. 3 includes two axle assemblies, the work vehicle 10 may generally have any number of axle assemblies. For instance, in one embodiment, the work vehicle 10 may include three axle assemblies.

Figure 4:
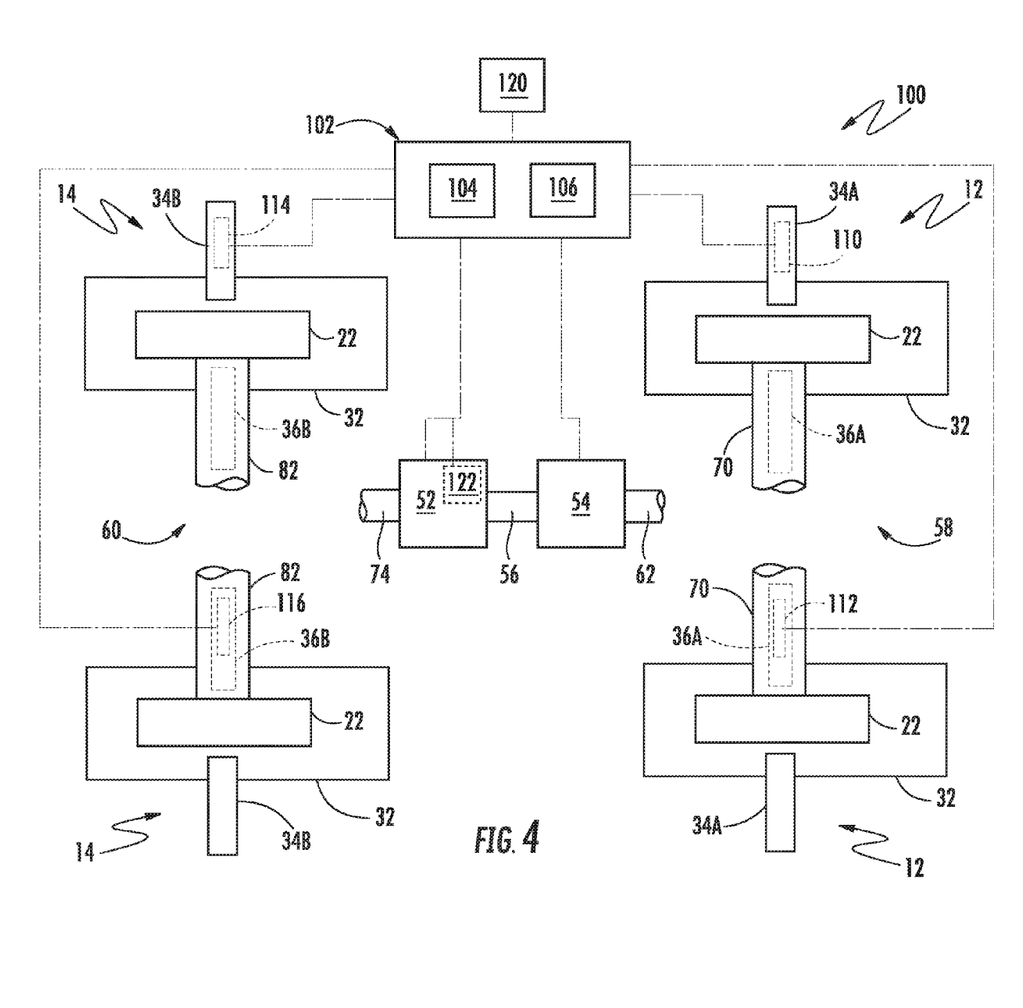
FIG. 4 illustrates a simplified, schematic view of one embodiment of a system for automatically controlling the speed of a track-driven work vehicle based on monitored track loads in accordance with aspects of the present subject matter.

Referring now to FIG. 4, a schematic view of one embodiment of a system 100 for automatically controlling the speed of a track-driven work vehicle based on monitored track loads is illustrated in accordance with aspects of the present subject matter. Specifically, FIG. 4 illustrates a partial, schematic view of portions of the components of the track assemblies 12, 14 and the drivetrain 50 described above with reference to FIG. 3. For example, FIG. 4 illustrates schematic views of the front pivot pins 34A, 36A configured to couple the undercarriage support beam 32 of each front track assembly 12 to the chassis 16 as well a portion of the front axle assembly 58 (e.g., the drive shafts 70) utilized to rotatably couple the drive wheels 22 of the front track assemblies 12 to the engine 52. In addition, FIG. 4 illustrates schematic views of the rear pivot pins 34B, 36B configured to couple the undercarriage support beam 32 of each rear track assembly 14 to the chassis 16 as well a portion of the rear axle assembly 60 (e.g., the drive shafts 82) utilized to rotatably couple the drive wheels 22 of the rear track assemblies 14 to the engine 52.

As shown, the system 100 may generally include a controller 102 configured to provide control outputs for controlling one or more components of the work vehicle 10, such as the engine 52 and/or the transmission 54 of the work vehicle 10. For example, as will be described below, the controller 102 may be configured to provide suitable control outputs designed to limit the vehicle speed of the work vehicle 10 based on one or more the monitored track loads so as to prevent damage to the vehicle's tracks 20 due to overheating.

In general, the controller 102 may correspond to any suitable processor-based device known in the art, such as any suitable computing device and/or any combination of computing devices. Thus, in several embodiments, the controller 102 may include one or more processor(s) 104 and associated memory device(s) 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 of the controller 102 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store suitable computer-readable instructions that, when executed by the processor(s) 104, configure the controller 102 to perform various computer-implemented functions, such as the methods described herein. In addition, the controller 102 may also include various other suitable components, such as a communications circuit or module, one or more input/output channels, a data/control bus and/or the like.

It should be appreciated that the controller 102 may correspond to an existing controller of the work vehicle 10 or the controller 102 may correspond to a separate processing device. For instance, in one embodiment, the controller 102 may form all or part of a separate plug-in module that may be installed within the work vehicle 10 to allow for the disclosed system and method to be implemented without requiring additional software to be uploaded onto existing control devices of the vehicle 10.

In several embodiments, the controller 102 may be configured to monitor the loads transmitted through one or more of the pivot pins 34A, 36A, 34B, 36B associated with each track assembly 12, 14 of the work vehicle 10. For example, in one embodiment, each track assembly 12, 14 may include one or more load sensors 110, 112, 114, 116 provided in operative association with one or both of its pivot pins 34A, 36A, 34B, 36B. Each load sensor 110, 112, 114, 116 may be configured to sense the loads being transmitted through its corresponding pivot pin 34A, 36A, 34B, 36B between the associated undercarriage support beam 32 and the vehicle chassis 16. As will be described below, such detected loads may then be utilized to calculate or estimate a speed limit setting for the work vehicle 10 to prevent overheating of the vehicle's tracks 20 based on the current loading condition of the vehicle 10.

It should be appreciated that the load sensors 110, 112, 114, 116 may be provided in operative association with the outboard pivot pins 34A, 34B and/or the inboard pivot pins 36A, 36B of each track assembly 12, 14. For example, in the illustrated embodiment, one of the front track assemblies 12 includes a load sensor 110 (indicated by dashed lines) associated with its front outboard pivot pin 34A while the other front track assembly 12 includes a load sensor 112 (indicated by dashed lines) associated with its front inboard pivot pin 36A. Similarly, one of the rear track assemblies 14 includes a load sensor 114 (indicated by dashed lines) associated with its rear outboard pivot pin 34B while the other rear track assembly 14 includes a load sensor 116 (indicated by dashed lines) associated with its rear inboard pivot pin 36B. However, in other embodiments, the system 100 may have any other suitable sensor configuration, such as by including load sensors associated with only the outboard pivot pins 34A, 34B of the track assemblies 12, 14 or only the inboard pivot pins 36A, 36B of the track assemblies 12, 14 and/or by including load sensors associated with both the outboard and inboard pivot pins 34A, 36A, 34B, 36B of each track assembly 12, 14.

In several embodiments, the load sensors 110, 112, 114, 116 may be integrated into or otherwise form part of each pivot pin 34A, 36A, 34B, 36B. Specifically, in one embodiment, the pivot pins 34A, 36A, 34B, 36B may correspond to load-sensing pins. In such instance, each load sensor 110, 112, 114, 116 may be built-into its corresponding pivot pin 34A, 36A, 34B, 36B. For example, load-sensing pins are known that incorporate internal strain gauge transducers and/or other load sensors for monitoring loads being transmitted through the pins. Such load-sensing pins are commercially available from various suppliers, including, but not limited to, Strainsert, Inc. of Conshocken, Pa.

Alternatively, the load sensors 110, 112, 114, 116 may correspond to separate components configured to be provided in operative association with their corresponding pivot pins 34A, 36A, 34B, 36B. For instance, the load sensors 110, 112, 114, 116 may correspond to strain gauges configured to be coupled to an exterior surface of each pivot pin 34A, 36A, 34B, 36B. In another embodiment, load sensors 110, 112, 114, 116 may correspond to compressive load sensors configured to be provided between each pivot pin 34A, 36A, 34B, 36B and an adjacent component of the work vehicle 10 (e.g., the brackets coupled between each pivot pin 34A, 36A, 34B, 36B and the corresponding undercarriage support beams 32, the bearing support members 38 and/or the chassis 16).

As indicated above, by monitoring the loads transmitted through the pivot pins 34A, 36A, 34B, 36B associated with the front and rear track assemblies 12, 14, the controller 102 may be configured to determine a speed limit setting for the work vehicle 10 so as to prevent overheating of the vehicle's tracks 20. For example, experimental temperature data for the vehicle's tracks 20 may be obtained (e.g., using temperature sensors) by performing experiments in which the monitored track loads and/or the number of compression cycles experienced at a given vehicle speed (with the number of compression cycles being determined as a function of the vehicle speed and the time at which the vehicle 10 is maintained at such speed) are varied. Based on such experimental temperature data, a mathematical model(s) or function(s) may be developed that relates the operating temperatures of the tracks 20 to both the monitored track load and the vehicle speed. This relationship may then be used to calculate a speed limit setting for the work vehicle 10 based on the monitored track load. For example, for a track having a given set of track parameters (e.g., a given rubber composition or other material composition, a given track thickness, etc.), a threshold may be determined that corresponds to the maximum temperature below which it is desired to maintain the operating temperature of the tracks 20 to prevent damage due to overheating. This predetermined temperature threshold together with the monitored track load may then be plugged into the developed mathematical function to determine the corresponding speed limit setting for the work vehicle 10.

It should be appreciated that the controller 102 may be configured to dynamically adjust the speed limit setting for the work vehicle 10 as the monitored track load(s) varies. For example, in one embodiment, the mathematical function(s) relating track temperatures to track loads and vehicle speed may be stored within the controller's memory 106. In such an embodiment, by knowing the predetermined temperature threshold associated with the vehicle's tracks 20 and by continuously monitoring the track load(s) (e.g., via the load sensors 110, 112, 114, 116), the controller 102 may dynamically calculate a new speed limit setting for the work vehicle 10 based on the current track load(s). Alternatively, a look-up table may be developed (e.g., using the predetermined mathematical function(s)) that directly relates the monitored track load(s) to a given speed limit setting for the work vehicle 10 based on the predetermined temperature threshold associated with the specific tracks 20 installed on the work vehicle 10. In such instance, the look-up table may be stored within the controller's memory 106 and directly referenced by the controller 102, as necessary, to adjust the vehicle's speed limit setting based on changes in the monitored track load(s). For instance, the look-up table may provide a predetermined loading/speed schedule that correlates a plurality of different track load values to a plurality of different speed limit settings based on the predetermined temperature threshold associated with the tracks 20. Thus, based on the monitored track load(s), the controller 102 may select the speed limit setting that is associated with current track load on the look-up table.

It should be appreciated that, in addition to monitoring the loads transmitted through the pivot pins 34A, 36A, 34B, 36B, the controller 102 may also be configured to monitor the vehicle speed using any suitable speed sensing means and/or methodology known in the art. For instance, in one embodiment, the controller 102 may be communicatively coupled to a vehicle speed sensor 120 configured to directly monitor the vehicle's speed, such as by providing a vehicle speed sensor(s) in operative association with one of the track assemblies 12, 14 or by using any other suitable vehicle speed sensor (e.g., a GPS device configured to monitor the vehicle's speed). Alternatively, the controller 102 may be communicatively coupled to any other sensor that provides an indication of the current vehicle speed. For instance, in an alternative embodiment, the controller 102 may be coupled to an engine speed sensor 122 configured to monitor the output speed of the engine 52. In such an embodiment, by knowing the current output speed of the engine 52 as well as the current gear ratio of the transmission 54, the controller 102 may be configured to calculate the current vehicle speed.

It should be appreciated that the controller 102 may be configured to automatically limit the vehicle speed to the maximum speed associated with the speed limit setting determined for the work vehicle 10 based on the monitored track load(s). For instance, if the vehicle speed increases to a level above the maximum speed associated with the current speed limit setting, the controller 102 may be configured to automatically reduce the vehicle speed to a speed at or below the maximum speed, such as by automatically downshifting the transmission 54 and/or by automatically adjusting the output speed of the engine 52. Similarly, if the operator commands a vehicle speed that exceeds the maximum speed associated with the speed limit setting, the controller 102 may be configured to automatically control the operation of the transmission 54 and/or the engine 52 such that the vehicle speed does not exceed the maximum speed, such as by limiting the operation of the transmission 54 and/or the engine 52 such that the vehicle speed is only increased to a level at or below the maximum speed.

In a particular embodiment of the present subject matter, the controller 102 may be configured to monitor the track load(s) relative to various different predetermined load thresholds. For instance, the controller 102 may be configured to monitor the track load(s) relative to a first load threshold, a second load threshold, a third load threshold and a fourth load threshold, with the second load threshold being greater than the first load threshold, the third load threshold being greater than the first and second load thresholds and the fourth load threshold being greater than the first, second and third load thresholds. In such an embodiment, each load threshold may be associated with a differing maximum speed limit setting for maintaining the operating temperature of the vehicle's tracks 20 below their predetermined temperature threshold. For instance, in the event that the monitored track load(s) exceeds the first load threshold, the controller 102 may be configured to automatically limit the vehicle speed to less than a first maximum speed limit (e.g., less than 40 kilometers-per-hour (KPH)). However, if the monitored load(s) continues to increase and exceeds the second load threshold, the controller 102 may be configured to automatically limit the vehicle speed to less than a second maximum speed limit (e.g., less than 35 KPH). Similarly, if the monitored load(s) continues to increase and exceeds the third load threshold, the controller 102 may be configured to automatically limit the vehicle speed to less than a third maximum speed limit (e.g., less than 30 KPH). Moreover, if the monitored load(s) continues to increase and exceeds the fourth load threshold, the controller 102 may be configured to automatically limit the vehicle speed to less than a fourth maximum speed limit (e.g., less than 25 KPH).

It should also be appreciated that, as an alternative to decreasing the speed limit setting for the work vehicle 10 based on increasing load thresholds, the controller 102 may, instead, be configured to reduce the speed limit setting based on the total amount of time that the vehicle 10 has been operating at a given track load(s). For instance, when the monitored track load(s) initially exceeds a given predetermined load threshold, the controller 102 may be configured to automatically limit the vehicle speed to less than a first maximum speed limit (e.g., less than 40 KPH). Thereafter, if the monitored track load(s) is maintained above the load threshold for a given period of time (e.g., one hour), the controller 102 may be configured to automatically limit the vehicle speed to less than a second maximum speed limit (e.g., less than 35 KPH). Similarly, if the monitored track load(s) is maintained above the load threshold for an even longer period of time (e.g., two hours), the controller 102 may be configured to automatically limit the vehicle speed to less than a third maximum speed limit (e.g., less than 30 KPH). Such a methodology may be continued by incrementally the decreasing the maximum speed limit for the work vehicle 10 as the monitored load(s) is maintained above the load threshold for even longer periods of time.

Additionally, in several embodiments, the controller 102 may be configured to provide an operator of the work vehicle 10 with a notification that the vehicle speed is being limited to a given maximum speed so as to prevent overheating of the vehicle's tracks. For instance, the controller 102 may be configured to provide a visual notification by transmitting a control signal(s) to a display panel, light and/or other any other suitable component located within the cab 18 that is configured to serve as a visual indicator to the operator. In addition to the visual notification or as an alternative thereto, the controller 102 may be configured to provide an audible notification by transmitting a control signal(s) to a speaker and/or other any other suitable component located within the cab 18 that serves an auditory indicator for the operator.

Figure 5:
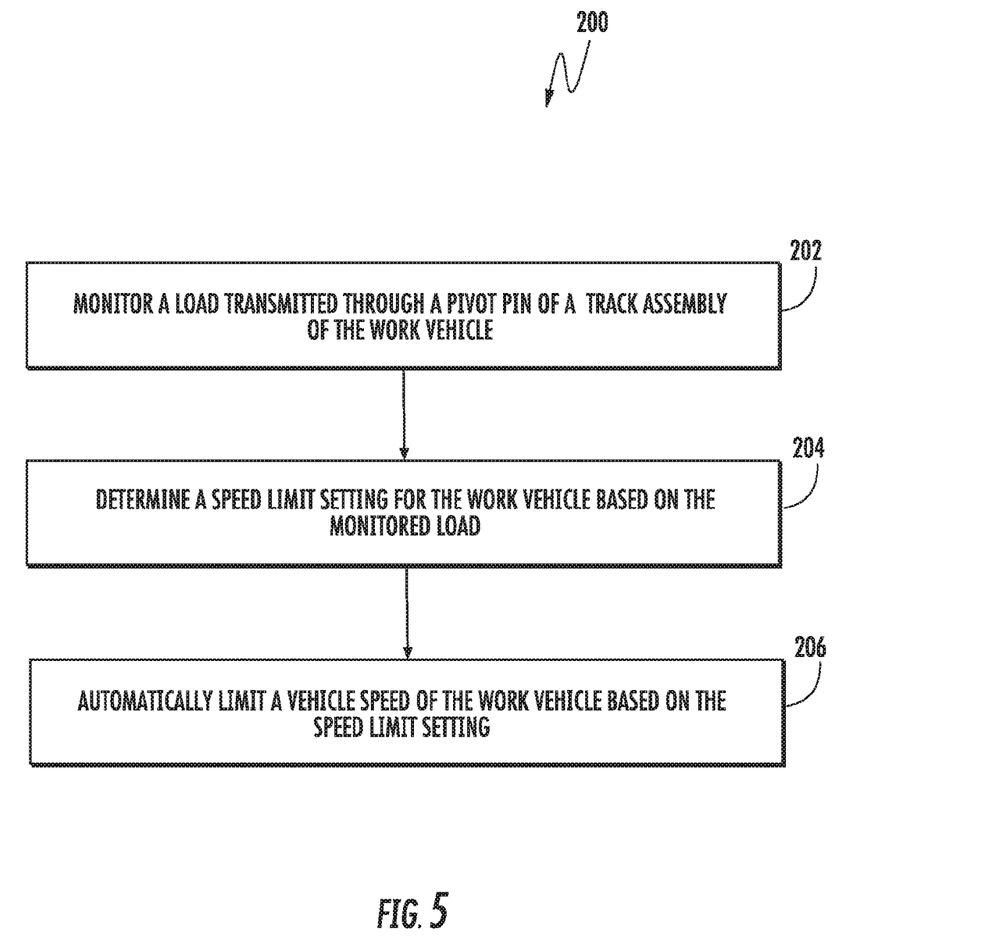
FIG. 5 illustrates a flow diagram of one embodiment of a method for automatically controlling the speed of a track-driven work vehicle based on monitored track loads in accordance with aspects of the present subject matter.

Referring now to FIG. 5, a flow diagram of one embodiment of a method 200 for automatically controlling the vehicle speed of a track-driven work vehicle based on monitored track loads is illustrated in accordance with aspects of the present subject matter. In general, the method 200 will be described herein with reference to the vehicle configuration shown in FIGS. 1-3 and the system 100 described above with reference to FIG. 4. However, it should be appreciated by those of ordinary skill in the art that the disclosed method 200 may also be implemented with any other suitable vehicle configuration and/or within any other suitable system. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 includes monitoring a load transmitted through a pivot pin of a track assembly of the work vehicle. Specifically, as indicated above, one or more load sensors 110, 112, 114, 116 may be associated with the pivot pins 34A, 34B, 36A, 36B of one, some, or all of the track assemblies 12, 14. As such, the controller 102 may be configured to monitor a load(s) associated with the loads being transmitted through such pivot pin(s) 34A, 34B, 36A, 36B. For example, based on the sensor measurements, the controller 102 may be configured to directly monitor the vertical and/or horizontal loads being transmitted through the pivot pin(s) 34A, 34B, 36A, 36B.

Additionally, at (204), the method 200 includes determining a speed limit setting for the work vehicle based on the monitored load. As indicated above, the controller 102 may be configured to determine a speed limit setting as a function of the monitored load(s) that associated with maintaining the operating temperature of one or more of the vehicle's tracks 20 below a predetermined temperature threshold. For instance, the controller 102 may be configured to determine the speed limit setting using a mathematical function(s) that correlates track temperatures to both the monitored track load and the vehicle speed. Alternatively, the controller 102 may utilize a look-up table that directly relates the monitored track load(s) to a given speed limit setting for the work vehicle 10 based on the predetermined temperature threshold associated with the tracks 20 installed on the work vehicle 10.

Moreover, at (206), the method 200 may include automatically limiting a vehicle speed of the work vehicle based on the speed limit setting. Specifically, in several embodiments, the controller 102 may be configured to automatically control the operation of the vehicle's engine 54 and/or transmission 52 so as to ensure that the vehicle speed is maintained at or below the maximum speed associated with the speed limit setting. As such, the controller 102 may maintain the operating temperature of the vehicle's tracks 20 below their corresponding temperature threshold, thereby preventing excessive heat generation within the tracks 20 and, thus, avoiding damage due to overheating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatically controlling vehicle speeds of a track-based work vehicle, the method comprising:
    monitoring, with a computing device, a load transmitted through a pivot pin of a track assembly of the work vehicle;
    determining, with the computing device, a speed limit setting for the work vehicle based on the monitored load, the speed limit setting being associated with maintaining an operating temperature of a track of the track assembly below a predetermined temperature threshold; and
    automatically limiting, with the computing device, a vehicle speed of the work vehicle based on the determined speed limit setting.

2. The method of claim 1, wherein the pivot pin is configured to pivotally couple an undercarriage support beam of the track assembly to a chassis of the work vehicle.

3. The method of claim 2, wherein the pivot pin is located inboard or outboard of a drive wheel of the track assembly.

4. The method of claim 1, wherein monitoring the load transmitted through the pivot pin comprises monitoring the load using a load sensor provided in operative association with the pivot pin.

5. The method of claim 4, wherein the load sensor is configured to directly sense the load transmitted through the pivot pin.

6. The method of claim 4, wherein the pivot pin corresponds to a load-sensing pin, the load sensor being integrated into the pivot pin.

7. The method of claim 1, wherein determining the speed limit setting comprises referencing a look-up table stored within memory of the computing device, the look-up table correlating a plurality of different load values for the monitored load to a plurality of different speed limit settings based on the predetermined temperature threshold associated with the track.

8. The method of claim 1, wherein determining the speed limit setting comprises calculating the speed limit setting based on a mathematical function stored within memory of the computing device that correlates the monitored load to a given speed limit for the work vehicle based on the predetermined temperature threshold associated with the track.

9. The method of claim 1, wherein determining the speed limit setting comprises setting the speed limit setting to a first maximum speed limit when the monitored load exceeds a predetermined load threshold.

10. The method of claim 9, further comprising:
    determining that the monitored load has exceeded the predetermined load threshold for a given period of time; and
    adjusting the speed limit setting for the work vehicle to a second maximum speed limit, wherein the second maximum speed limit is less than the first maximum speed limit.

11. The method of claim 1, wherein automatically limiting the vehicle speed comprises automatically controlling at least one of an engine or a transmission of the work vehicle such that vehicle speed is maintained at or below a maximum speed associated with the speed limit setting.

12. The method of claim 1, wherein the track is formed from an elastomeric material.

13. A system for automatically controlling vehicle speeds of a track-based work vehicle, the system comprising:
    a track assembly including an undercarriage support beam and a drive wheel configured to engage a track, the track assembly further including a pivot pin configured to pivotally couple the undercarriage support beam to a chassis of the work vehicle;
    a load sensor configured to monitor a load transmitted through the pivot pin; and
    a controller communicatively coupled to the load sensor, the controller being configured to determine a speed limit setting for the work vehicle based on the monitored load and automatically limit a vehicle speed of the work vehicle based on the determined speed limit setting,
    wherein the speed limit setting is associated with maintaining an operating temperature of the track below a predetermined temperature threshold.

14. The system of claim 13, wherein the pivot pin is located inboard or outboard of the drive wheel.

15. The system of claim 13, wherein the load sensor is configured to directly sense the load transmitted through the pivot pin.

16. The system of claim 13, wherein the pivot pin corresponds to a load-sensing pin, the load sensor being integrated into the pivot pin.

17. The system of claim 13, wherein the controller is configured to determine the speed limit setting by referencing a look-up table stored within memory of the controller, the look-up table correlating a plurality of different load values for the monitored load to a plurality of different speed limit settings based on the predetermined temperature threshold associated with the track.

18. The system of claim 13, wherein the controller is configured to determine the speed limit setting using a mathematical function that correlates the monitored load to a given speed limit for the work vehicle based on the predetermined temperature threshold associated with the track.

19. The system of claim 13, wherein the controller is configured to automatically control at least one of an engine or a transmission of the work vehicle such that vehicle speed is maintained at or below a maximum speed associated with the speed limit setting.

20. The system of claim 13, wherein the track is formed from an elastomeric material.

* * * * *